3,671,191
Patented June 20, 1972

3,671,191
PREPARATION OF HIGH SILICA SYNTHETIC FAUJASITE
Philip Kenerick Maher, Baltimore, Edwin Wolf Albers, Annapolis, and Carl Vance McDaniel, Laurel, Md., assignors to W. R. Grace & Co., New York, N.Y.
No Drawing. Filed Sept. 16, 1970, Ser. No. 72,872
Int. Cl. C01b 33/28
U.S. Cl. 23—113      5 Claims

ABSTRACT OF THE DISCLOSURE

High silica crystalline aluminosilicates are prepared by forming an aqueous reaction mixture with sources of sodium hydroxide, silica, alumina, and nucleation centers (seeds), a portion of the excess sodium hydroxide being neutralized by the addition of a strong mineral acid or ammonium sulfate, and crystallizing the reaction mixture at an elevated temperature. Sodium silicate solution can be used as the silica source. Partial neutralization of the sodium silicate solution with a strong mineral acid such as sulfuric acid prevents excess solubilization of the silica and thereby increases the silica to alumina ratio in the final product.

BACKGROUND OF THE INVENTION

The present invention relates to the production of crystalline aluminosilicates commonly referred to as molecular sieves. More specifically, the invention relates to the preparation of faujasite materials using a special technique:

(a) to maintain the silica to alumina ratio at or above about 4,
(b) to decrease the quantity of reactants, and
(c) to utilize inexpensive raw materials.

Faujasite is a naturally occurring aluminosilicate. It has a characteristic X-ray structure. The synthetic materials designated Zeolite X and Zeolite Y by the Linde Division of Union Carbide Corporation are commonly referred to as synthetic faujasites. Zeolite Y is described in U.S. Patent 3,103,007 and is generally similar to Zeolite X described in U.S. Patent 2,882,244. The chemical formula for Zeolite Y given in U.S. Patent 3,103,007 is as follows:

0.9±.2 Na$_2$O: Al$_2$O$_3$: WSiO$_2$: XH$_2$O wherein W has a value of greater than 3 and up to about 6 and X may have a value as high as 9.

This phase of faujasite is distinguished from the zeolite designated Type X zeolite by the silica to alumina ratio. The silica to alumina ratio affects the important physical properties of the faujasite. The syntheitc faujasite having a silica to alumina ratio in excess of 4 and preferably about 5 is more thermally stable than the same material having a lower silica to alumina ratio. As a result, high silica faujasite is particularly useful as a catalyst ingredient or in certain selective adsorption processes wherein the zeolite would be expected to encounter high temperatures during regeneration.

One of the shortcomings of the prior art processes is the requirement that at least a portion of the silica be furnished by a more expensive silica such as silica sol or particulate silica.

The high silica faujasite (silica to alumina ratio above 4) cannot be prepared from sodium silicate and sodium aluminate without the addition of nucleation centers (seeds). When a product having a silica to alumina ratio above 5.0 is to be prepared, it is sometimes necessary to prevent solubilization of the silica in the sodium hydroxide by partial neutralization of the sodium hydroxide.

This is because the preparation of the sodium aluminate and the addition of the proper quantities of nucleation centers (seeds) adds excess sodium hydroxide to the reaction mixture. The sodium hydroxide tends to keep the silica in solution and prevents the interaction of the silica with the alumina to prepare the zeolite having a high silica to alumina ratio.

We have found that synthetic faujasite having a silica to alumina ratio of at least 5 can be consistently prepared using our novel process.

In our process, a portion of the sodium hydroxide is neutralized by adding a strong mineral acid such as sulfuric acid to the sodium silicate solution.

In our process, a synthetic faujasite, having a silica to alumina ratio of at least 5 is prepared by diluting commercial sodium silicate solutions to the desired silica level and partially neutralizing the sodium hydroxide by adding a strong mineral acid thus forming soluble sodium salts. The sodium aluminate solution is then prepared and mixed with the sodium silicate solution and a quantity of nucleation centers (seeds) is added to this mixture followed by high temperature aging for an appropriate period of time to effect crystallization.

Alternately, the sodium silicate solution, after dilution, is heated to 70° C. prior to addition of the acid. The sodium silicate solution is maintained at 70° C. throughout the addition of the sodium aluminate and the addition of the nucleation centers (seeds).

Application Ser. No. 738,116, filed July 19, 1968 and now abandoned, describes a process for preparing crystalline aluminosilicates using the seeding technique. The zeolite seeds are nucleation centers having an average size below about 0.1 micron. As pointed out in this application, the seeding technique is advantageous in that it decreases the aging time necessary for formation of the zeolite. It should also be emphasized that high silica faujasite cannot be prepared from sodium silicate and sodium aluminate unless the seeding technique is used.

In the conventional process, the reaction product is aged at varying temperatures for periods of 1 to 4 days. Using the seeding technique, the aging time can be substantially reduced.

As pointed out above, a portion of the sodium hydroxide added is neutralized by the addition of a neutralizing agent such as a strong mineral acid, preferably sulfuric acid, thus reducing the solubilization of the silica resulting in a high silica to alumina rato in the final product.

The first step of the process is the preparation of a precursor mixture. The solution of sodium silicate necessary to prepare a reaction mixture having the proper amount of silica is prepared from a commercially available sodium silicate having a silica to sodium oxide ratio of about 3.3 to 1. The silicate is diluted sufficiently to decrease the tendency of the silicate to gel on addition of the acid.

In the second step of the process, the sodium aluminate solution is prepared by dissolving the proper amount of alumina trihydrate in sodium hydroxide. The sodium aluminate solution is prepared to contain about 10% alumina and about 8.3–8.8% Na$_2$O.

The next step of the process is the preparation of the slurry of nucleation centers (seeds). Application Ser. No. 738,116 describes this preparation in some detail. Satisfactory results are achieved by preparing the seed slurry by dissolving commercially available alumina in sodium hydroxide and mixing the solution with commerically available sodium silicate solution. The solutions are conveniently mixed by adding the aluminate solution to the silicate solution with rapid stirring. The slurry is allowed to stand at room temperature for a period of 24 hours. An optimum seed slurry is prepared by mixing the solutions to have the molar ratios as follows:

| | |
|---|---|
| $SiO_2/Al_2O_3$ | 14–16 |
| $Na_2O/Al_2O_3$ | 15–17 |
| $H_2O/Na_2O$ | 19–21 |

The nucleation centers can also be prepared by mixing the reactants in the ratios set out above and heating the slurry to 140° F. for a period of about 1 hour.

The parent application describes a process for preparing nucleation centers by aging at room temperature for a period of about 4 hours. This aging time can be shortened to about 1 hour by heating to 140° F.

A strong mineral acid, preferably sulfuric acid, is diluted to a concentration of about 10 to 17%. The reactant mixture is prepared by first adding the diluted sulfuric acid to the sodium silicate solution. The sodium hydroxide concentration is decreased in the slurry by adding 0.4 to 2 moles preferably 0.39 mole of sulfuric acid per mole of alumina with the attendant formation of 0.39 mole of sodium sulfate.

After the sodium silicate solution is partially neutralized, it is mixed with the sodium aluminate solution, preferably by adding the aluminate solution to the acid treated sodium silicate solution.

The preferred method of operation is the preparation of a reactant slurry containing 3.5 to 7 moles of $Na_2O$, 1 mole of $Al_2O_3$, 10 to 16 moles of $SiO_2$, and 140 to 280 moles of water.

When the addition of the reagents is complete, the resulting slurry is stirred for an additional period of time. Satisfactory results are achieved when the slurry is stirred for a period of 5–15 minutes. A slurry of nucleation centers (seeds) is then added. The nucleation centers are normally added to a concentration of about 0.1 to about 10% by weight of the desired product. Although larger amounts of seeds may be added without a deleterious effect, amounts in excess of 10% do not substantially increase the formation rate of the product. Mixing for a period of about 10 minutes gives a good dispersion of the seeds in the reaction mixture.

The next step of the process is the aging or crystallization step. The crystallization step is carried out for periods of about 2 to 16 hours. Crystallization is normally complete in about 8 to 9 hours when a portion of the sodium hydroxide is neutralized with sulfuric acid. The crystallization is carried out by heating the slurry to a temperature of about 80–120° C. and maintaining the slurry at that temperature. The progress of the crystallization is followed by sampling the reaction mixture periodically and determining the surface area of the product at that time.

Our invention is further illustrated by the following specific but non-limiting examples.

Example 1

A nucleation center (seed) slurry was prepared by dissolving 26 grams of alumina trihydrate in a solution containing 153 grams of sodium hydroxide in 279 ml. of water. A sodium silicate solution having a silica to sodium oxide ratio of about 3.3 to 1 was diluted by adding 310 grams of water to 525 grams of the silicate. The two solutions were mixed by adding the silicate solution to the sodium aluminate solution at a rate of 150 ml. per minute with rapid stirring during the entire mix. The mixture was allowed to stand for 24 hours at room temperature and was then ready for use. The reactant mole ratios were as follows:

| | |
|---|---|
| $SiO_2/Al_2O_3$ | 14–16 |
| $Na_2O/Al_2O_3$ | 15–17 |
| $H_2O/Na_2O$ | 19–21 |

Example 2

This example illustrates the laboratory procedure for preparing the zeolite.

A total of 71.3 grams of commercially available alumina trihydrate was dissolved in a solution containing 51.2 grams of sodium hydroxide in 100 grams of water. The mixture was heated to near boiling to dissolve the alumina. After dissolution, the alumina was diluted by adding 250 ml. of water. A sulfuric acid solution was prepared by adding 20.1 grams of 97.3% sulfuric acid to 200 grams of water. This was a solution containing 8.9 weight percent sulfuric acid.

A sodium silicate solution was prepared by diluting 1547 grams of a sodium silicate solution having a silica to alumina ratio of about 3.3 to 1 with 720 grams of water. The sulfuric acid solution was added directly to the diluted silicate with rapid stirring. The sodium aluminate solution was added to the silicate solution by adding the aluminate to the silicate and stirring for an additional 10 minutes after addition was complete.

The slurry was then transferred to a reaction vessel where about 242 ml. of nucleation centers (seeds) prepared according to the method described in Example 1 were added. The slurry volume before seed addition was 2422 ml. The reactant mole ratios after seed addition were:

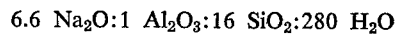

$$6.6\ Na_2O:1\ Al_2O_3:16\ SiO_2:280\ H_2O$$

The seed slurry was added and the mixture stirred to 10 minutes to insure good dispersion of the seeds. The mixture was heated to a temperature of about 100° C. and heating continued for a period of 9 hours without agitation of the slurry. At the end of this time, the reaction vessel was cooled to room temperature and the product removed, washed, and dried. A total of 224 grams of the zeolite was recovered. The product had a silica to alumina ratio of 5.2.

Example 3

This example illustrates the plant procedure for preparing the product.

A sodium silicate solution was prepared by adding 1000 gallons of water to 3360 gallons of a 30.7 Bé. sodium silicate solution to prepare 35500 pounds of diluted silicate. A sulfuric acid solution was made up by diluting 24 gallons of a 97.3% sulfuric acid to 429 gallons with water to prepare a total 3570 pounds of a diluted acid. The acid solution was then pumped into the sodium silicate solution with stirring after assuring that the point of addition of the acid is moved constantly to prevent formation of large chunks of silica gel that might be difficult to redissolve.

A total of 450 gallons (5060 pounds) of sodium aluminate solution was prepared by dissolving 2550 pounds of alumina trihydrate in 3660 pounds of 50% sodium hydroxide solution that was then diluted with 469 gallons of water. The solution was added to the acid treated sodium silicate solution. The resultant slurry was then agitated for a period of one hour.

After the two slurries were mixed thoroughly, a total of 500 gallons of seeds, prepared according to the method described in Example 1, were then pumped into the slurry with adequate precautions being taken to prevent high localized concentration of the reactants and to insure good dispersion of the seeds.

The slurry was mixed for a period of 45–60 minutes. At this point, the steam was turned on and the crystallization started. The slurry reached a temperature of 212° F. in about 30 minutes. The temperature was maintained at 212° F. throughout the crystallization. Crystallization was continued for a period of 12 hours with samples being taken beginning with the eight hour and continuing every hour thereafter to check on the progress of the crystallization. The product was recovered by cooling the crystallization reactor to room temperature, removing the product, washing, and drying. The product had a silica to alumina ratio of 5.4.

Example 4

In this example, the neutralization of the excess $Na_2O$ in the reactant mixture was effected by the use of ammonium sulfate.

A total of 21.8 grams of sodium aluminate was dissolved in 100 ml. of water and 212 grams of sodium silicate solution was diluted with 50 ml. of water. The silicate and aluminate solutions were mixed and 7 grams of ammonium sulfate was dissolved in 100 ml. of water and was added with vigorous stirring. A total of 10 ml. of nucleation centers was added and the slurry heated for a period of 6 hours. The surface area of the product was determined and found to be 860 square meters per grams. The $Na_2O$ content was 13.6%.

It is apparent from these data that ammonium sulfate can also be used to neutralize a portion of the excess $Na_2O$ in the slurry.

What is claimed is:

1. A process for preparing the faujasite crystalline aluminosilicates having the faujasite structure and a silica to alumina ratio above about 5 from a reactant mixture wherein the reactants are present in the following mole ratios:

$$3.5\text{--}7 \, Na_2O: Al_2O_3: 10\text{--}16 \, SiO_2: 140\text{--}280 \, H_2O$$

which comprises:
  (a) Preparing a sodium silicate solution in a quantity sufficient to provide the desired silica content in the reactant mixture.
  (b) Adding sulfuric acid to the silicate solution in an amount equal to 0.4 to 2 moles of acid per mole of alumina in the reactant mixture.
  (c) Preparing a sodium aluminate solution in a quantity sufficient to provide the desired alumina content in the reactant mixture.
  (d) Mixing the silicate and aluminate solutions and adding a quantity of zeolitic nucleation centers having an average particle size below about 0.1 micron equal to about 0.1 to 10 weight percent of the reactant mixture.
  (e) Heating to about 100° C. for about 2 to 16 hours to insure crystallization.
  (f) Washing, drying and recovering the zeolite product.

2. The process according to claim 1 wherein the sodium silicate solution has a $SiO_2$ to $Na_2O$ ratio of about 3.0 to 1.

3. The process according to claim 1 wherein the sodium aluminate solution contains about 10 percent alumina and 8 to 9 percent $Na_2O$.

4. The process according to claim 1 wherein the sulfuric acid is diluted to a concentration of about 10 to 17% prior to addition to the silicate solution.

5. A process for preparing a crystalline zeolite having the faujasite structure and a silica to alumina ratio above about 5 from a reactant mixture wherein the reactants are present in the following molar ratios:

$$6.6 \, Na_2O: Al_2O_3: 16 \, SiO_2: 280 \, H_2O$$

which comprises:
  (a) Preparing a sodium silicate solution having a $SiO_2$ to $Na_2O$ ratio of about 3.0 to 1 in a quantity sufficient to provide the desired silica content in the reaction mixture,
  (b) Preparing a sulfuric acid solution to contain about 17 percent $H_2SO_4$ and adding an amount of said acid to the silicate solution equal to 0.4 to 2 moles of acid per mole of alumina in the reactant mixture.
  (c) Preparing a sodium aluminate solution to contain about 10 percent alumina and 8 to 9 percent $Na_2O$ in a quantity sufficient to provide the desired alumina content in the reactant mixture.
  (d) Mixing the silicate and aluminate solutions and adding a quantity of zeolitic centers having an average particle size below about 0.1 micron equal to about 0.1 to 10 weight percent of the reactant mixtures.
  (e) Heating to about 100° C. for about 6 to 16 hours to crystallize the zeolite, and
  (f) Washing, drying and recovering the product.

References Cited
UNITED STATES PATENTS

| | | | |
|---|---|---|---|
| 3,130,007 | 4/1964 | Breck | 23—113 |
| 3,510,258 | 5/1970 | Hindin | 23—113 |
| 3,574,538 | 4/1971 | McDaniel et al. | 23—112 |
| 3,321,272 | 5/1967 | Kerr | 23—113 |

EDWARD J. MEROS, Primary Examiner

23—111